Patented June 6, 1939

2,161,455

UNITED STATES PATENT OFFICE 2,161,455

CONCENTRATION OF LATEX

Albert M. Clifford, Stow, Ohio, assignor to Wingfoot Corporation, Wilmington, Del., a corporation of Delaware No Drawing. Application October 31, 1935, Serial No. 47,728

5 Claims. (Cl. 18—50)

This invention relates to the concentration and stabilization of latex. It includes the process of concentration and the concentrated product. It also includes stabilized latices. Furthermore it includes as new compounds the alkali metal salts of lauryl phosphate, such as the sodium and potassium salts.

It has been found that the alkali metal salts of the phosphoric esters of higher alcohols are useful as stabilizers for rubber latices. They may be used for stabilizing unconcentrated latex and also for stabilizing latices concentrated by various different methods. When added to latex during concentration these salts prevent the latex from coagulating under conditions which would otherwise cause coagulation.

The latex to be concentrated may be fresh latex or preserved latex but preferably is latex which is stabilized by the addition of some one of the usual stabilizing agents added to the latex, which agent, however, does not prevent coagulation of latex when it is evaporated. Agents ordinarily employed for this purpose include ammonia, formaldehyde, sodium sulfite, etc. Instead of using latex of normal rubber concentration, i. e., as it comes from the tree, the latex may first be concentrated to some extent by any other known method such as by centrifuging or creaming and then if an alkaline salt of one of the phosphoric esters of a higher alcohol is added the latex may be further concentrated by evaporation without undesirable coagulation. The concentrated product produced in any of these ways is a product of high rubber content and contains some of the alkali metal salt of the phosphoric acid ester of the higher alcohol employed during the concentration by evaporation.

Example 1

A solution of sodium monocetyl phosphate was prepared by adding a small amount of water to 5.0 parts by weight of monocetyl phosphate followed by the gradual addition of NaOH with shaking until the ester had dissolved and the solution was slightly alkaline to phenolphthalein. The total amount of the solution was 173 parts by weight.

To 170 parts by weight of a concentrated latex containing approximately 60% of rubber and ammonia only, as a stabilizing agent, 160 parts by weight of the above prepared sodium cetyl phosphate solution was added. The resulting mixture was stirred until homogeneous and a sample withdrawn showed a rubber concentration of 32.4%. This mixture was evaporated by heating in an open vessel with stirring over a water bath at a temperature of 70–80° C. After one hour the concentration of rubber was increased to 42.5%. After 1.5 hours it was increased to 48.2%. The concentration was effected smoothly with no more than slight tendency to skin formation over the outer portions of the vessel which were not thoroughly agitated. The concentrated latex was redispersible. It was obtained in the form of a smooth soft paste. Microscopic examinations showed the 48% paste to be completely redispersible in water but no different in appearance from the 32.4% concentration. There was no coagulum and no aggregation of particles.

Example 2

Forty-three parts by weight of lauryl alcohol and 45 parts by weight of $P_2O_5$ were refluxed with absolute ether for 24 hours. The ether was decanted and evaporated at room temperature. This gave 49.7 parts of viscous liquid which by titration was found to contain 79.70% monolauryl phosphate. One part by weight of monolauryl phosphate was suspended in 50 parts of water and made alkaline to phenolphthalein by the addition of dilute sodium hydroxide. This and sufficient water were added to 150 grams of concentrated latex (containing 60% rubber and known to the trade as Jatex, formed by centrifuging latex) to give a total weight of 300 parts. The resulting mixture was concentrated by heating on a water bath at 80–90° C. The original mixture contained 32.5 parts of rubber. After 1½ hours heating a rubber content of 54.6% was obtained and after two hours a concentrated latex of 62.6% rubber content was obtained.

Example 3

Six hundred c. c. of fresh latex (33.7% dry rubber content) containing .3% $NH_3$ were treated with 3.6 grams of sodium lauryl phosphate and evaporated at 75–80° C. with constant stirring on a water bath until the final concentration was 58.4% dry rubber content.

Other salts of phosphoric esters of higher alcohols which may be employed for the stabilization of unconcentrated and concentrated latices and which prevent the coagulation of latex on evaporation include esters of primary alcohols containing 10 to 30 carbon atoms such as the alkali metal salts of phosphoric esters of ceryl, octadecyl, melissyl and myricyl alcohols.

The preparation of the sodium salt of lauryl phosphate is given in Example 2. Other salts such as the potassium salt may be made by using potassium hydroxide instead of sodium hydroxide as there described.

I claim:

1. The method of concentrating latex by evaporation which comprises heating latex to which a di-alkali metal salt of a phosphoric acid ester of a higher aliphatic primary alcohol has been added.

2. The method of concentrating latex which comprises heating latex which contains a di-alkali metal cetyl phosphate.

3. The method of concentrating latex which comprises heating latex which contains a di-alkali metal lauryl phosphate.

4. The method of concentrating latex which comprises heating latex which contains an alkaline alkali metal salt of a higher aliphatic alcohol phosphate.

5. The method of concentrating latex which comprises adding an alkaline alkali metal salt of a phosphoric acid ester of a higher aliphatic primary alcohol to a concentrated latex and then further concentrating the resulting solution by evaporation.

ALBERT M. CLIFFORD.